United States Patent
Jiang et al.

(10) Patent No.: US 7,308,017 B2
(45) Date of Patent: Dec. 11, 2007

(54) DS-CDMA INTEGRATION SPREADING COHERENT RECEIVER

(75) Inventors: Liangcheng Jiang, Jiangsu (CN); Xiaohu You, Jiangsu (CN); Junchao Wang, Beijing (CN); Jinghong Guo, Jiangsu (CN); Shixin Cheng, Jiangsu (CN)

(73) Assignees: The Research Institute of Telecommunication Transmission, MII, Beijing (CN); Southeast University, Nanjing, Jiangsu (CN)

( * ) Notice: Subject to any disclaimer, the term of this patent is extended or adjusted under 35 U.S.C. 154(b) by 597 days.

(21) Appl. No.: 10/450,883

(22) PCT Filed: Dec. 18, 2001

(86) PCT No.: PCT/CN01/01633

§ 371 (c)(1),
(2), (4) Date: Nov. 21, 2003

(87) PCT Pub. No.: WO02/060104

PCT Pub. Date: Aug. 1, 2002

(65) Prior Publication Data

US 2004/0081114 A1    Apr. 29, 2004

(30) Foreign Application Priority Data

Dec. 18, 2000    (CN) .............................. 00 1 28221

(51) Int. Cl.
*H04B 1/00* (2006.01)

(52) U.S. Cl. ...................... 375/140; 375/344; 375/349

(58) Field of Classification Search ................ 375/130, 375/136, 137, 140, 141–143, 145, 147, 150, 375/152, 316, 344, 349
See application file for complete search history.

(56) References Cited

U.S. PATENT DOCUMENTS

| | | | |
|---|---|---|---|
| 5,764,630 A * | 6/1998 | Natali et al. | 370/320 |
| 6,081,547 A | 6/2000 | Miya | |
| 6,275,699 B1 * | 8/2001 | Ichihara | 455/434 |
| 6,381,264 B1 * | 4/2002 | Lomp et al. | 375/149 |
| 6,430,166 B1 * | 8/2002 | Bejjani et al. | 370/320 |
| 6,731,911 B1 * | 5/2004 | Hirata et al. | 455/71 |
| 6,822,999 B1 * | 11/2004 | Lee et al. | 375/145 |
| 7,085,246 B1 * | 8/2006 | LaRosa et al. | 370/311 |

FOREIGN PATENT DOCUMENTS

EP    0901237 A2    3/1999

OTHER PUBLICATIONS

Rives et al An Algorithm for Isolated Object Location in Digital Images, May 1982, ICASSP 1982, pp. 1924-1927.*

* cited by examiner

*Primary Examiner*—Chieh M. Fan
*Assistant Examiner*—Freshteh N Aghdam
(74) *Attorney, Agent, or Firm*—McDermott Will & Emery, LLP

(57) ABSTRACT

The Spread Spectrum integration coherent receiver of the invention employs a time division multiplexing correlator bank and thus obtained coherent channel evaluator as a core. The receiver can execute initial PN synchronization, RAKE diversity coherent combination, AFC and adjacent cell search and combination receipt, and soft handoff. Further, "part capture in parallel based on slide energy window" and "tracking loop based on energy window barycenter" are introduced into the receiver of the invention, thereby simplifying the structure of the RAKE receiver. The receiver is capable of overcoming multipath fading, ensuring the RAKE receipt performance.

11 Claims, 1 Drawing Sheet

DS-CDMA INTEGRATION SPREADING COHERENT RECEIVER

FIELD OF THE INVENTION

The present invention relates to a CDMA (code division multiple access) cellular communication system.

BACKGROUND OF THE INVENTION

Mobile communication techniques have become a widely used communication manner for their advantages such as flexibility and convenience since 1980s. In a lot of mobile communication standards, CDMA cellular communication technique shows great potential for its features associated with large capacity, simple frequency planning, good communication quality and small electromagnetic interference. IS-95 CDMA cellular communication system proposed by Qualcomm Inc. and rapidly developed all over the world uses this CDMA cellular communication technique. Several candidate schemes of the third generation of digital cellular communication system are established on the basis of CDMA techniques.

Multipath fading which causes serious multipath interference exists in a mobile communication system. In general, it is necessary to receive pilot signals with confirmation information so as to evaluate the amplitude and phase information of multipath signals, and it is possible to achieve multipath diversity and coherent reception. A coherent spread spectrum receiver which performs diversity process is referred to as RAKE coherent receiver. RAKE coherent receiver can correct phases of a plurality of singlepath signals which carry same information and are independence from one another in fading features, and perform maximal combination to overcome multipath fading and improve received signal-to-interference ratio.

To achieve RAKE reception function, Synchronizing local spread spectrum sequence (PN code) with received signal is necessary. The synchronization is achieved by acquiring and tracking steps. The acquiring step acquires a pilot channel and confirms that initial synchronization (coars synchronization) of PN code is complete. The combination of these two steps provides PN code and accurate local timing required for RAKE receiver.

Mobile communication spread spectrum receivers in CDMA cellular communication system have capabilities of diversity combination receipt to achieve soft handoff so as to improve receiving performance at boundaries of cells.

CDMA receivers have large local oscillation frequency-offset in turn-on losing lock state due to the limit of cost. An automatic frequency correction (AFC) function is introduced into the receivers so that the RAKE receivers can operate normally in large local oscillation frequency-offset state.

SUMMARY OF THE INVENTION

It is therefore an object of the present invention to provide direct sequence spread spectrum integration coherent receiver designed with a "energy window barycenter" method to overcome the disadvantages due to the non-determinacy of multipath signals in mobile communication. The receiver according to the invention can process multipath energy window in parallel, and execute the operations such as synchronization track, RAKE diversity coherent combination, AFC and adjacent cell search and combination receipt, and soft handoff, there by improving the performance of CDMA spread spectrum receivers, and reducing hardware.

The present invention is implemented by the technical solution described later.

The Spread Spectrum integration coherent receiver according to the invention uses a time division multiplexed correlator bank and thus obtained coherent channel evaluator as a core. Further, the receiver can execute initial PN synchronization, RAKE diversity coherent combination, AFC and adjacent cell search and combination receipt, and soft handoff. Furthermore, "partially acquiring in parallel based on sliding energy window" and "tracking loop based on energy window barycenter" are introduced into the receiver according to this invention. Unlike processing a singlepath as disclosed in patents issued to Qualcomm Inc., the receiver according to the present invention can solve the problems caused by multipath fading, ensure the RAKE receipt performance and simplify the structure of the RAKE receiver.

According to an aspect of the invention, it provides a direct sequence spread spectrum/CDMA integration spread spectrum coherent receiver comprising a state control means for receiving control information from a CPU (center processor unit), generating control information used for operating each of units, recording the generating unit for receiving a external clock, generating CPU interruption signals required for entire system, timing clock and time sequence by dividing frequency and counting, and for adjusting the timing based on a PN code tracking unit and the state control unit; a correlator bank for performing effective correlating integration by time division multiplexing one complex correlator to form equivalent correlators; a post correlation data processing unit for receiving the output from one of correlator in the correlation bank, processing the data included in the output from the correlator, performing initial acquisition, adjacent cell search, selection of effective multipath based on the energy window according to the control information from. state control unit; a PN code tracking unit for receiving a channel evaluation relating to effective multipath of pilot channel from the post correlation data processing unit, calculating a energy window barycenter and a loop filter to obtain a mode value for a variable mode counter, and sending the mode value to the timing generating unit to finely adjust the PN code generation clock, thereby adjusting local PN code phase; and an automatic frequency correction (AFC) loop calculating unit for performing frequency error evaluation and loop filter calculation based on the information associated with effective multipath of the pilot channel, and sending the obtained result to a controllable frequency reference unit.

The principle of the invention will be discussed.

The algorithm executed by the CDMA spreading coherent receiver of the invention includes parts of channel parameter evaluation, maximal ratio combination, and associated initial PN acquisition, track, AFC, adjacent cell search, handoff, and macro-diversity. Each of parts is described as follows.

1. Channel Parameter Evaluation

A pilot channel in CDMA system is used for transferring a pilot sequence known in advance which may provide a system timing, extract carriers, evaluate channels, and execute hand-off, etc. The equivalent baseband receiving signals may be expressed as shown in equation (1) when the system simultaneously transmits signals through a plurality of channels, $$r(t) = \sum_n c_n \cdot \sum_i s_i(t - n/W) + z(t) \quad (1)$$

wherein $s_i(t)$ represents the signs and equivalent baseband signals transmitted through ith code division channel in downstream channels. The term of i=0 corresponds to the pilot channel. z(t) is complex White Gaussian noise of zero average value, $c_n$ is a fading factor of nth path of the channels. The purpose for evaluating channel parameter is to evaluate channel fading factor $c_n$ based on the received signals r(t) and the known pilot sequence $s_0(t)$.

It is assumed that frequency selectivity slow fading channel model is used as a mobile channel, $c_n$ is then approximate to a constant within the channel evaluation region. The evaluation value of $c_n$ is given as follow:

$$\bar{c}_n = \frac{1}{NE_c} \int_0^{NT_c} r(t - nT_c) \cdot s_0^*(t) dt = c_n + N_a + N_c + N_z \quad (2)$$

wherein $N_a$, $N_c$, and $N_z$ are th outputs caused by multipath interference, multiple access interference and white noise passed through a correlator due to the non-ideal correlation characteristic, $T_c$ is a time width of one chip, $NT_c$ is an integration region of a channel evaluation, and $E_c$ is energy transmitted through a pilot channel within one chip.

2. Maximal Ratio Combination

After obtaining the channel parameter evaluation values for each of paths, other channels carrying data are coherently demodulated. To this end, it only needs to despread each of paths of other channels. The channel evaluation parameter $c_n$ obtained by using equation (2) weights the amplitude of despreaded results for each of paths and corrects the phase thereof to make the despreaded results in phase combine. This processing is referring to as maximal ratio combination. The equation will be described in detail as follows:

$$\bar{d}_i = \frac{1}{E_b} \sum_n \bar{c}_n^* \int_0^{T_s} r(t - nT_c) \cdot s_i^*(t) dt \quad (3)$$

wherein $\bar{d}_i$ is data transmitted on with channel carrying data, $T_s$ is a sustaining interval of data, $\bar{c}_n^*$ and $\bar{c}_n$ is a conjugate pair. In practice, it is not that all paths, which may be identified by RAKE receiver, have effective signal components. Comparing $\bar{c}_n$ with a threshold, only the multipath components which $\bar{c}_n$ are higher than the threshold are combined.

3. Local Pilot Signal Restore

In foregoing channel evaluation, it is necessary to know pilot signals $s_0(t)$. Therefore, the pilot signals $s_0(t)$ are restored in local based on the received signals r(t). Restoring the pilot signals $s_0(t)$ comprises acquiring step which performs coarsely synchronization (initial synchronization) and tracking step which performs fine synchronization. Acquiring pilot signals is also referred to as PN codes acquisition. Tracking pilot signals is also referred to as PN codes track. In this invention, acquiring pilot signals is performed by using initial synchronization method of CDMA cellular system based on the maximal energy window. Tracking pilot signals is performed by using pilot signal track method based on multipath channel energy window barycenter tracking loop.

Next, the principle of initial synchronization in CDMA cellular system based on the maximal energy window is described.

In initial synchronization stage of a CDMA receiver, the phase information of received signals can not be known. It is necessary to evaluate multipath fading channels in fraction intervals, and try evaluation using local pilot sequence (PN code) with different phase. In this case, following equation (4) can be derived from equation (2).

$$\bar{c}_{n,m}(k) = \frac{1}{NE_c} \int_0^{NT_c} r(t - nT_c - mT_c/M) \cdot s_0^*(t - kT_c/M) dt, \quad (4)$$

$$m = 0, 1, \Lambda\ M - 1$$

wherein $T_c/M$ is fraction sampling intervals, k is a possible certain phase parameter of the local pilot PN sequence.

The effective distribution range of channel fading factor $c_n$ in equation (1) is defined as energy distribution window of multipath signal (hereinafter is referred to as multipath energy window). The size of the window may be determined by time-delay extend range of multipath channels. For the sake of simplifying discussion, the effective distribution range of $c_n$ may be set to $n \in [-L_1, L_2]$. The size of the window in multipath fading circumstances may be set differently for different areas, for example, 3 μs for cities, 6 μs for countries, and 15 μs for mountain areas. The size of window is associated with the circumstances where the cellular communication system is located, and is regardless of the used frequency band. The size of multipath energy window may be selected according to the maximal likelihood value, for example, no more than 30 μs, and then the value of $L = L_2 - L_1 + 1$ is not more than 30 μs/$T_c$ so that a spread spectrum receiver can be used in various circumstances.

In a multipath energy window, not all signal arrival paths are effective. To this end, a threshold may be set to judge the signal energy (i.e., intensity of $c_n$) for each of paths in the window. A signal arrival path is judged as effective path when the signal energy is larger than the threshold. Otherwise, the path is judged as a pure interference path. To avoid the degradation of the performance, the calculation is not applied to all pure interference paths. The threshold is set slightly larger than the side lobe value of a pilot signal (PN code) partial correlation value.

To obtain sufficient acquisition precision, a receiver samples the received signals using over-sampling technique. The sampling rate is M times the chip rate of PN code. Assuming the length of PN code required for synchronizing is p, the PN code acquiring method of the invention selects a phase from M×P possible PN code phases, and maximize the multipath energy contained in the multipath energy window.

According to above concept of multipath energy window, the multipath energy window which the phase of local PN code is k is defined as follow:

$$E_{win}(k) = \sum_{n=-L_1}^{L_2} \sum_{m=0}^{M-1} |\bar{c}_{n,m}(k)|^2 \quad (5)$$

the acquiring method based on multipath energy window is there described as the selection of a value k which makes following equation (6) have a maximal value from all possible values k of local PN code phase:

$$\max_k E_{win}(k) \quad (6)$$

On the other hand, it can be seen from equation (4), the multipath energy window calculation as shown in equation (5) exists following derivative relationship associated with a sliding window:

$$E_{win}(k+1) = E_{win}(k) - |\bar{c}_{L_2M-1}(k)|^2 + |\bar{c}_{L_1,0}(k+1)|^2 \quad (7)$$

Thus, Initial synchronization calculation can be greatly simplified.

The method of searching adjacent cells is similar with the initial synchronization method of PN code except for that the PN code utilized in the equation is a pilot signal sequence in a certain adjacent cell, the region to be searched is a designating region in advance by a base station, but not all possible phases of PN codes.

Next, the principle of pilot channel tracking method based on the multipath energy window barycenter tracking loop is described.

If K denotes the evaluated result of kth channel, the barycenter of corresponding multipath energy window is given by $cg(k) = cg_w(k)/cg_s(k)$, wherein $cg_w(k)$ and $cg_s(k)$ are calculated as follows:

$$cg_w(k) = \sum_n n|\bar{c}_n(k)|^2, \quad cg_s(k) = \sum_n |\bar{c}_n(k)|^2 \quad (8)$$

wherein n corresponds to the position where the multipath fading factor $\bar{c}_n(k)$ locates in multipath energy window. It should be noted that each of $\bar{c}_n(k)$ S to be calculated in equation (8) is an effective signal arrival path which is large than designated threshold.

PN code tracking loop for multipath energy window barycenter is designed such that the target position of a multipath energy window barycenter is set to $cg_{target}$ so that the PN code phase of the receiver can be adjusted by detecting the difference between the multipath energy window barycenter r value $cg(k)$ and $cg_{target}$ to reduce the difference. For simplifying the calculation, it s assumed that $cg_{target}$ is set to zero, the phase adjustment of local PN code can be then performed by simply judging the polarity of $cg_w(k)$, but not need to calculate $cg_s(k)$ and $cg(k)$.

To avoid incorrect adjustment due to the random changes of multipath fading signals and channel evaluation errors, the barycenter evaluating value calculated by equation (3) is smoothly filtered. Assuming the smoothly filtered evaluating value is $\overline{cg_w(k)}$, the adjusting operation can generalized to:

let the phase of local PN code lead δ if $\overline{cg_w(k)} > 0$ let the phase of local PN code lag δ if $\overline{cg_w(k)} < 0$ let the phase of local PN code hold if $\overline{cg_w(k)} = 0 \quad (9)$ The local PN code phase adjusting unit performs the operation as shown in equation (9). According to an embodiment of the present inversion, the local PN code phase adjustment is executed by finely adjusting the transmitting clock of local PN code. FIG. 2 illustrates an operation flowchart of the method according to the invention. In FIG. 2, the PN code clock is generated by courting the frequency division of a multiple times (M times) the external clock. A variable mode counter finely adjusts the chip clock. The mode value of the counter is M−1 if the $\overline{cg_w(k)}$ is positive. The mode value is M+1 if the $\overline{cg_w(k)}$ is negative. Otherwise, the mode value of the counter is M. In this way, the PN code phase can be adjusted as shown in equation (9), and the phase difference of fine adjustment is $\delta = T_c/M$, wherein M may be 32 or 64 to measure the adjustment accuracy enough.

4. Automatic Frequency Correction (AFC)

In practice, the stability of initial frequency in a mobile terminal is limited to about 1 ppm because of the restrict by volume and cost, etc. This results in there are approximate several hundred Hz to several KHz frequency difference between a base station and a mobile terminal. Therefore, it is necessary to introduce an automatic frequency correction (AFC) function into mobile terminals, thereby preventing the degradation of the system performance. In view of the effects due to the frequency difference between transmitting side and receiving side, the equivalent baseband model in equation (1) can be depicted as equation (10):

$$r(t) = \sum_n c_n \cdot e^{j\Delta\omega_c t} \sum_i s_i(t - n/W) + z(t) \quad (10)$$

wherein $\Delta\omega_c$ is the frequency difference between a transmitting side and a receiving side. The channel evaluation as shown in equation (2) can be modified as shown in equation (11):

$$\bar{c}_n = \frac{1}{NE_c} \int_0^{NT_c} r(t - nT_c) \cdot s_0^*(t) dt \quad (11)$$

$$= c_n \cdot \left\{ e^{j\Delta\omega_c NT_c/2} \frac{\sin(\Delta\omega_c NT_c/2)}{\Delta\omega_c NT_c/2} \right\} + N_a + N_c + N_z$$

$$\cong c_n e^{j\Delta\omega_c NT_c/2} + N_a + N_c + N_z$$

wherein assuming $\Delta\omega_c NT_c/2 \ll 1$. The evaluation value of $\Delta\omega_c$ is obtained by using the evaluation value of $\bar{c}_n$ in two sequential regions $t \in [0, NT_c]$ and $t \in [(N+1)T_c, (2N+1)T_c]$, and assuming that $c_n$ does not charge in the two sequential regions. The local oscillator source of a mobile terminal can be adjusted by using the obtained evaluation, thereby achieving AFC function.

5. Soft Hand-off and Macro-diversity

Soft hand-off and macro-diversity are essential function for a CDMA cellular communication system. A mobile terminal detects the intensity of signals from adjacent base stations when the mobile terminal enters boundaries of two or more adjacent cells. When the intensity of the signal from a certain base station is larger than a predetermining value, the mobile terminal enters into macro-diversity state, communicates with two or more base stations simultaneously, and combines the same data transmitted from the two or more base stations to improve the performance of the mobile terminal when it is in boundaries of cells.

The detection of signal intensity, which is required by soft hand-off, from adjacent base stations can be achieved by evaluating the intensity of pilot channel transmitted from the adjacent base stations. This can be accomplished by replacing the pilot signals in equation (2) with the pilot signals from the adjacent base stations and performing channel evaluation on a certain multipath distributing region. When the evaluated pilot signals are larger than a predetermined intensity, the mobile terminal informs the base station with which is communicating of the event and prepares to enter into a macro-diversity state.

The signals from a plurality of base stations need to be received and combined when the mobile terminal enters into a macro-diversity state. This can be accomplished by replacing the spread spectrum signals (sequence) in equation (3) with the spread spectrum signals transmitted from the adjacent base stations and simultaneously receiving data from two or more base stations in macro-diversity state, and then performing post combination after aligning in time

THE ADVANTAGES OF THE INVENTION

The present invention provides a initial synchronization method based on the energy window and PN code track method based on the energy window barycenter with respect to the random change characteristic in multipath fading circumstances. This method does not need to individually process each delay path. Therefore, the stability of a spread spectrum receiver in multipath fading circumstances is improved. This invention also induce the operation which need to be performed by a spread spectrum receiver into equations (2) (or (5)) and equation (3). Further, this invention provides a design method used for spread spectrum receivers so that the hardware used in spread spectrum receivers is greatly reduced.

BRIEF DESCRIPTION OF THE DRAWINGS

The above and other objects, features, and advantages of the present invention will become apparent from the following description with reference to the accompanying drawings, which illustrate examples of the present invention.

DETAILED DESCRIPTION OF THE PREFERRED EMBODIMENTS

Referring now to the accompanying drawings, there are shown preferred embodiments of the invention. As described above, each of parts in a spread spectrum receiver is based upon equations 3 and 11 (or equation 2). The spread spectrum receiver can accomplish functions such as initial synchronization of the pilot channel, track and channel evaluation, multipath maximal ratio combination, AFC, adjacent cell search, hand-off, and macro-diversity. Accordingly, this invention provides the arrangement of a CDMA spread spectrum receiver.

Figure 1:
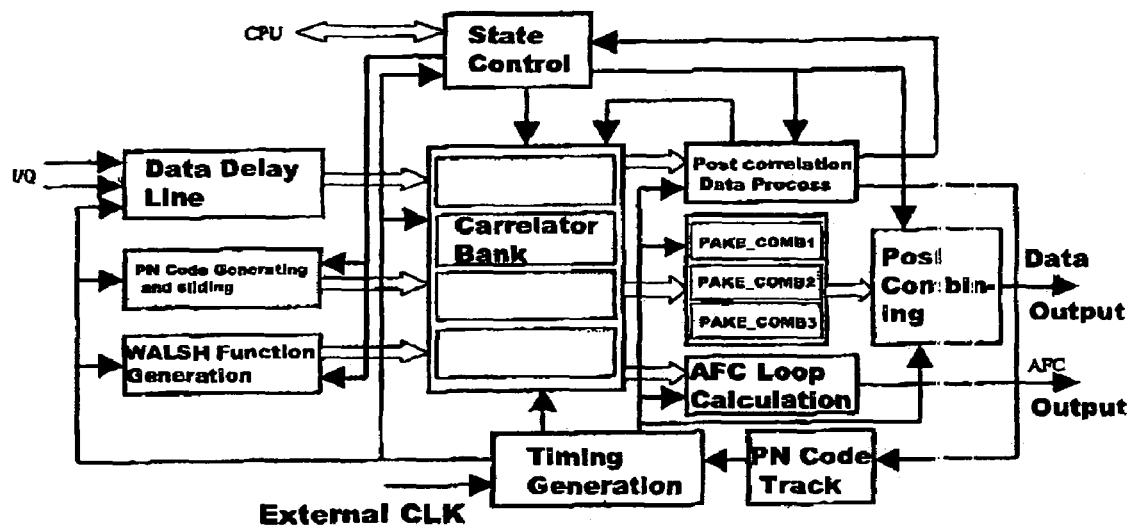
FIG. 1 schematically illustrates a configuration of a spread spectrum receiver according to an embodiment of the invention.
Figure 2:
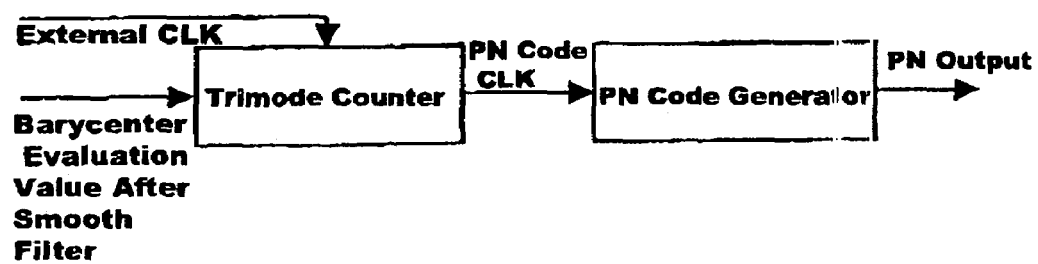
FIG. 2 schematically illustrates a diagram showing the PN code phase adjustment according to an embodiment of the invention.

A preferred embodiment of the invention will be discussed with reference to FIG. 1.

The CDMA spread spectrum receiver according to the invention comprises a state control unit (FSM_CONTROL), a timing generating unit (SYS_CLK), a data delay line unit (DELAY_LINE), a correlator bank (CORRELATOR_BANK), a post correlation data processing unit (POST_CPRR), a RAKE combining unit (RAKE_COMB), a post combining unit (POST_COMB), a PN code generating and sliding unit (PN_GROUP), a WALSH function generating unit (WALSH_GEN), an AFC loop calculating unit (AFC_LOOP), and a PN code tracking unit. The functions and operation of each of the units are described as follows.

1. State Control Unit (FSM_CONTROL)

The state control unit includes a CPU interface block, A receiver state transformation control (TOP_FSM) block, and a unit state control signal generating (DOWN_FSM) block. The state control unit interacts with the CPU, which is controlled by baseband, of information, receives control information from the CPU, generates control information used for operating state transformation of each of units, records the operation states of each of the units and reports the states to the CPU. The CPU interface has a build-in RAM. The storage capacity of the RAM may be determined as desired, for example, 64×8 bits. The CPU read/writes the RAM in the manner of interrupting poll, interacts with the state transformation control block of the receiver to transfer information. TOP_FSM scans the RAM in the period of interrupting signals (e.g., 26.27 ms, 20 ms, or 10 ms depended upon the application or the state of a receiver) and receives control information from the CPU (e.g., acquiring state, searching state, receiving states of various code channel) and system parameters (e.g., the number of code channel, spread spectrum rate, searching region, and frame-offset, etc.) required for arranging operation so as to determine next operation state. Further, the TOP_FSM instructs the DOWN_FSM to generate control signals for other units. The information indicating that state transformation is complete is transferred to the RAM unit so that the CPU can obtain corresponding feedback information.

2. Timing Generating Unit (SYS_CLK)

The timing generating unit receives external clocks (in general, 16 times or 32 times the spread spectrum sequence chip rate), generates CPU interruption signals required for entire system, timing clock and time sequence by dividing frequency and counting, and adjusts the timing based on a PN code tracking unit and the state control unit. The timing generating unit generates N sets of timing signals dependent on the receiving links of each of base stations to support macro-diversity of at most N base stations. Further, The timing generating unit tracks the timing in accordance with the channel evaluation of respective base stations and the result of the tracking unit. In the process of macro-diversity, the relative time-delay changes of respective receiving links are measured and reported to the CPU. The CPU controls the post-control unit to perform macro-diversity function after aligning the time-delay of respective links.

3. Data Delay Line Unit (DELAY_LINE)

The data delay line unit comprises four sets of RAMs, which storage capacity is, for example, 18×6 bits, or D flip-flops. The data delay line unit samples 4 times the input data and outputs 72 delay taps with ¼ chip interval. The output data is provides to a correlator bank unit.

4. Correlator Bank Unit

The correlator bank comprises four banks of correlators. Each bank of correlators perform effective correlation integration 31 times by time division multiplexing one complex correlator (multiplexing with 32 times the chip rate), thereby forming 31×4 equivalent correlators sum total. Each of equivalent correlators performs the calculation as shown in equations 3 and 5 (or 2) with the chip interval. Correlators in each bank are numbered 0 to 30 in accordance with the sequence of time division multiplexing. Correlators 0-17 in each bank (sum to 4×18 equivalent correlators in four banks) are used for evaluating multipath channel in parallel. A following POST_CORR unit performs acquisition, adjacent cell search and effective selection etc. on the evaluated results. Correlators 8-30 in each bank are used for evaluating channels of effective paths from base stations and despread data carried on data channel. Marco-diversities of three base stations are supported.

The configuration of a correlator bank may be arranged as desired so as to easily support different system standard.

5. Post Correlation Data Processing Unit (POST_CORR)

The post correlation data processing unit receives the output from the correlators in correlation banks, and processes the data included in the output from the correlators, performs initial acquisition, adjacent cell search, selection of effective multipath based on the energy window according to the control signals from FSM_CONTROL unit. The processed results are provided to the PN code tracking unit, AFC loop unit and the state control unit.

6. RAKE Combining Unit (RAKE_COMB)

The RAKE combining unit receives the channel evaluated results from POST_CORR unit and decorrelates the data stream, and combines (equation 3) the effective multipath according to the control signals from FSM_CONTROL unit. The results are provided to a post combining unit.

7. Post Combining Unit (POST_COMB)

The post combining unit receives multipath combining results from RAKE_COMB unit, and determines whether or not to perform macro-diversity of a plurality of base stations according to the control signals from FSM_CONTROL unit. If macro-diversity is necessary, the post combining unit delays paths based on the time-delay difference of respective base stations provided by the CPU so as to align the paths to each other in time, and performs macro-diversity of a plurality of base stations.

8. PN Code Generating and Sliding Control Unit (PN_GROUP)

Five groups of PN codes are provided, wherein three of them are used for the despread data of three base stations. One of rest groups of PN codes is used for adjacent cell, the other group of PN codes is used for transmitter. The PN code used for adjacent cell search depends on main receiving links. The instantaneous process in PN code sliding process is shield to avoid confusing the demodulation results of the receiver. The timing of PN code used for transmitters depends on the timing of base stations which have been acquired when a receiver is turned on. When a link is released, the PN code of the link should synchronize with the PN code of main receiving link so that the relative reference positions among PN codes are in known state.

9. Walsh Function Generating Unit (WALSH_GEN)

The Walsh function generating unit is controlled by the slate control unit (FSM_CONTROL) and the timing generating unit (SYS_CLK), and generates three Walsh sequences depended on respective links.

10. AFC Loop Calculating Unit (AFC_LOOP)

The AFC loop calculating unit evaluates frequency error and calculates loop filter based on the effective multipath information of pilot channel provided from FSM_CONTROL and SYS_CLK, and send the result to a controllable frequency reference unit.

11. PN Code Tracking Unit (CG_LOOP TRACKING)

The PN code tracking unit receives the effective multipath channel evaluation of pilot channel from the post correlation data processing unit, calculates the energy window barycenter and loop filter, and obtains a mode value of a variable mode counter. The result is sent to the SYS_CLK unit to finely adjust the timing of local PN code, thereby adjusting the phase of local PN code.

Next, the operation of main function of CDMA spread spectrum receiver will be described.

1. Initial Acquisition Function

The CPU writes initial acquisition state control word into FSM_CONTROL unit. The control word has initial acquisition control command, the length of search region and the number of PN code used for sliding correlation, and integrating periods etc. When the start position of next frame is arrived at, the TOP_FSM block receives the initial acquisition information through the interface. Then, the TOP_FSM block initializes the acquisition, informs the DOWN_FSM block of the generation of PN code state control signal, the integrating period control signal of the CORRELATOR_BANK unit and the POST_CORR unit acquisition state control word etc.

The PN_GROUP unit periodically slides PN code after receiving the number of the used PN code and the number of sliding chips every time. The output of the PN_GROUP unit jumps 16 chips every integrating period and sends to the CORRELATOR_BANK unit.

The CORRELATOR_BANK unit receives baseband sampling input signals and PN code signals as described above. Then, the CORRELATOR_BANK unit periodically performs correlation calculation as shown in equation 2 or 5 based on the control signals from the DOWN_FSM block. Forty-six multipath channel evaluations with ¼ chip interval are obtained, and the results are sent to the POST_CORR unit for followed process.

The POST_CORR unit receives the parallel integration output from the CORRELATOR_BANK unit, and calculates the sliding energy window and compares it with a maximal value according to the control signals from the DOWN_FSM block.

Repeating above processes, the DOWN_FSM block send acquisition stop signal when the length of search period designated by the CPU is over. The POST_CORR unit sends the position and energy value of the maximal sliding energy window to the FSM_CONTROL unit and then read by the CPU.

The CPU obtains the position and energy value of the maximal sliding energy window and determines whether the energy is larger than the basic energy required for acquisition. If it is positive, the CPU sends the information of sliding PN code to the FSM_CONTROL unit. The FSM_CONTROL unit controls the corresponding PN code to establish the required initial synchronization PN code (hereinafter referring to as main synchronization code). If it is negative, this acquisition is fail.

After finishing initial synchronization, the CPU immediately informs the FSM_CONTROL unit to enter synchronization tracking state fit this time, the CORRELATOR_BANK unit performs correlation calculation based on the established main synchronization code. The result is sent to the POST_CORR unit. The POST_CORR unit selects effective paths, calculates the barycenter position, and generates a PN fine adjustment signals based on the shift of the barycenter. The SYS_CLK unit finely adjusts chip timing based on the fine adjustment signal to keep the synchronization of chip timing. Also, the CPU informs the FSM_CONTROL unit to perform AFC operation, and the result is used for adjusting the main reference clock of the RF block in the receiver.

2. Data Despread Function

When the receiver despreads a certain code channel, the CPU writes state control signals and parameters including the number of a code channel (WALSH sequence number), Integrating length etc. into the FSM_CONTROL unit. The TOP_FSM block reads the information when an interruption arrives at after the FSM_CONTROL unit receives the information from the CPU and informs the DWON_FSM block to generate associated control signals.

The PN_GROUP unit provides main PN code used for despread data.

The WALSH_GEN unit generates associated WALSH sequence number.

The CORRELATOR_BANK unit receives baseband sampling signals, main synchronization PN code and WALSH sequence, and performs integrating operation as shown in equation 3 based on the integration period control signal generated by the DWON_FSM block. At the same time, the CORRELATOR_BANK unit perform channel evaluating operation as shown in equation 5 (performing the evaluation of 4×18 channel parameters every integration interval). The POST_CORR unit extracts the result and sends it to the RAKE_COMB unit.

The function operation for despreading data, which is executed by the POST_CORR unit, relates to two aspects. On one hand, the number and position of the effective multipath is determined according to the received pilot signal, and then sent to the CORRELATOR_BANK unit so as to determine the position of despreading data associated with effective multipath in next integration interval. On the other hand, the channel parameters of effective multipath are chosen and then sent to RAKE_COMB unit to perform multipath combination.

The RAKE_COMB unit receives the results of effective multipath parameter evaluation and data despread to combine the maximal ratio, and send the combining result to a channel decode unit through a parallel interface.

3. Adjacent Cell Search Function

The process of adjacent cell search function is similar with the process of initial acquisition except for that the adjacent cell search function need to be performed along with other functions (for example, data despread function) simultaneously. The regions to be searched are the local areas designated by CPU.

4. Macro-Diversity and Soft Hand-off Function

The accomplishment of macro-diversity and soft Hand-off is more complex than other functions, which includes a macro-diversity preparing stage, a macro-diversity implementing stage, and a macro-diversity removing stage. In the macro-diversity preparing stage, the operation includes:

a. A mobile station searches the pilot signal intensity of each of base stations in accordance with the requirements of the base stations during the mobile station communicates with a single base station. When the signal intensity of station reports the base station of the searching result. After receiving a response from the base station, the mobile station modifies an active set maintained in the mobile station.

b. The time-delay from each base station to the mobile station is calculated for the purpose of determining the relationship between sign and time-delay of each base station. The calculated time-delay is reported to the CPU and provided to the POST_COMB unit to align the arrival time-delay combined by each base station After finishing the macro-diversity preparing stage, the mobile station enters the macro-diversity implementing stage. The mobile station searches the changes of signal intensity and the time-delay arrived at the mobile station for each of the base stations in real time while it combines a plurality of arrival signals of base stations. The mobile station adjusts the signs and delays of the signals arrived at the mobile station from each of base stations to ensure receiver synchronously receives signals from a plurality of base stations while the mobile station measures the intensity of pilot signal from each of base stations.

A T_Drops timer is started when the intensity of pilot signal from a certain base station is lower than the threshold. If the timer is expired, the processing proceeds to the macro-diversity removing stage.

In macro-diversity removing stage, the mobile station resets all timings and counts associated with the base stations which macro-diversity is to be removed. The PN code timing used in macro-diversity is restored to the state of synchronizing with a main base station. The pilot signal used by the base station is removed from the active set.

EXAMPLE

Next, the implement of the present invention is described with a mobile terminal in CDMA 2000 system used as an example. The mobile terminal may be a vehicle mobile station in CDMA 2000 cellular mobile communication system fitting Standard 3GPP2 Release A. The spread spectrum receiving part in the mobile station can be implemented by, for example, a XC4085xla FPGA chip, a product of Xilinx company. The main parameters are listed as follows:

Spreading chip rate is 1.2288 MHz;

I/Q sampling rate is 4×1.2288 MHz, 6 bits input;

External clock (EXT_CLK) is 39.3219 MHz;

Integrating period for channel evaluating is 384 chip intervals (N=384);

Initial synchronization time is 0.75 s;

Applicable range of AFC is ±2 KHz;

Data transformation rate is 19.2 kbps to 307.2 kbps.

The spread spectrum receiver according to the invention can provide excellent stability in the circumstances of vehicle mobile terminals.

The spread spectrum receiver according to the invention performs the operation as shown in equations (2) (or (5)) and equation (3) employs a time division multiplexing correlator bank and thus obtained coherent channel evaluator as a core. Further, The receiver includes a state control unit (FSM_CONTROL) and a post correlation process unit. Furthermore, the receiver can execute initial PN synchronization, RAKE diversity coherent combination, AFC and adjacent cell search and combination receipt, and soft handoff,

INDUSTRY PRACTICABILITY

1) The spreading coherent receiver according to the invention uses CDMA cellular system initial synchronization method based on a maximal energy window such that the RAKE receiver operates in the maximal energy window and improves the stability of acquiring initial synchronization 2) This invention uses a method for pilot channel tracking based on multipath channel barycenter tracking loop. The receiver according to the invention tracks multipath energy window, but not every delay path. Therefore, the stability of a spread spectrum receiver in multipath fading circumstances is improved and the hardware used in a spread spectrum receiver is greatly reduced. For tracking N base stations, it is only necessary to establish N energy barycenter tracking loops.

3) The spreading coherent receiver according to the invention uses time division multiplexed correlator banks to search, thereby greatly increasing the search speed.

4) The spreading coherent receiver according to the invention can accomplish functions such as initial synchronization of the pilot channel, track and channel evaluation, multipath maximal ratio combination, AFC, cell search, hand-off, and macro-diversity.

5) The design of the spreading coherent receiver according to the invention can be described by using VHDL or Verilog languages, implemented by FPGA or ASIC. DSP core or external DSP chip is not necessary in the spreading coherent receiver according to the invention.

Although embodiments of the present invention have been shown and described, it will be understood by those skilled in the art that changes may be made in these embodiments without departing from the principles and spirit of the invention, the scope of which is defined in the appended claims and their equivalents.

What is claimed is:

1. A direct spread spectrum/CDMA integration spreading spectrum coherent receiver comprising:
   a state control means for receiving control information from a CPU (center processor unit), generating PN code state control signals to be inputted into a PN code generating and sliding control unit, integrating period control signals to be inputted into a correlator bank, acquisition state control word to be inputted into a post correlation data processing unit, and state control word to be inputted into a post combing unit;
   a timing generating unit for receiving a external clock, generating CPU interruption signals required for entire system, timing clock and time sequence by dividing frequency and counting, and for adjusting the timing based on a PN code tracking unit;
   the correlator bank for receiving input signals from a data delay line unit, PN code signals from the PN code generating and sliding control unit, Walsh code signals from a Walsh function generating unit in order to perform the complex correlation integration between the input signal and the PN code signal multiplied by the Walsh coding signal, integrating period control signals form the timing generating unit respectively, and for periodically performing effective correlating integration by time division multiplexing one complex correlator to form equivalent correlators;
   the post correlation data processing unit for receiving the output from one of the correlators in the correlator bank, processing the data included in the output from the correlator, performing initial acquisition, adjacent cell search, selection of effective multipath based on the energy window according to the control signals from the state control unit;
   the PN code tracking unit for receiving a channel evaluation relating to effective multipath of pilot channel from the post correlation data processing unit, calculating the barycenter of a energy window and a loop filter to obtain a mode value for a variable mode counter, and sending the mode value to the timing generating unit to finely adjust the PN code generating clock, thereby adjusting local PN code phase; and
   an automatic frequency correction (AFC) loop calculating unit for performing frequency error evaluation and loop filter calculation based on the information associated with effective multipath of the pilot channel from the post correlation data processing unit, and sending the obtained result to a controllable frequency reference unit.

2. The direct spread spectrum/CDMA integration spreading spectrum coherent receiver according to claim 1, wherein the timing generating unit receives external clocks which are 16 times or 32 times the spread spectrum sequence chip rate.

3. The direct spread spectrum/CDMA integration spreading spectrum coherent receiver according to claim 1, wherein the correlator bank comprises four banks of correlators, the correlators in each bank perform effective correlation integration 31 times by time division multiplexing one complex correlator with 32 times the chip rate, thereby forming 31×4 equivalent correlators.

4. The direct spread spectrum/CDMA integration spreading spectrum coherent receiver according to claim 1, further comprising a data delay line including random access memory (RAM) or D flip-flop for four times sampling input data.

5. The direct spread spectrum/CDMA integration spreading spectrum coherent receiver according to claim 4, wherein the data delay line unit comprises four sets of RAM, which storage capacity is 18×6 bits, or D flip-flops, for outputting 72 delay taps with ¼ chip interval, and sending output data to the correlator bank unit.

6. The direct spread spectrum/CDMA integration spreading spectrum coherent receiver according to claim 1, further comprising a RAKE combining unit for receiving the channel evaluated results from the post correlation data processing unit and decorrelating the data stream, and combining the effective multipath according to the control signals from the state control unit.

7. The direct spread spectrum/CDMA integration spreading spectrum coherent receiver according to claim 1, in further comprising a post combining unit for receiving multipath combining results from RAKE combining unit, and determining whether or not to perform macro-diversity of a plurality of base stations according to the control signals from state control unit, if macro-diversity is necessary, the post-combining unit delays paths based on the time-delay difference of respective base stations provided by the CPU to align the paths to each other in time, and performs macro-diversity of a plurality of base stations.

8. The direct spread spectrum/CDMA integration spreading spectrum coherent receiver according to claim 1, further comprising a PN code generating and sliding unit for providing five groups of PN codes.

9. The direct spread spectrum/CDMA integration spreading spectrum coherent receiver according to claim 8, wherein three groups of PN codes provided by the PN code generating and sliding unit are used for despreading data of three base stations, one group of PN codes are used for searching adjacent cell, and the other group of PN codes are used for transmitter.

10. The direct spread spectrum/CDMA integration spreading spectrum coherent receiver according to claim 1, further comprising a Walsh function generating unit which is controlled by the state control unit and the timing generating unit for generating Walsh sequences depending on respective links and providing generated Walsh sequences to the correlator bank unit.

11. The direct spread spectrum/CDMA integration spreading spectrum coherent receiver according to claim 7, wherein the macro-diversity comprises a macro-diversity preparing stage, a macro-diversity implementing stage, and a macro-diversity removing stage.

* * * * *